Feb. 2, 1960 P. L. SCHOONOVER 2,923,538
ROTARY KILN CONSTRUCTION
Filed Sept. 19, 1955 3 Sheets-Sheet 1

INVENTOR.
PAUL L. SCHOONOVER,
BY
Edd D. O'Brien
ATTORNEY.

Feb. 2, 1960 P. L. SCHOONOVER 2,923,538
ROTARY KILN CONSTRUCTION
Filed Sept. 19, 1955 3 Sheets-Sheet 2

PAUL L. SCHOONOVER,
INVENTOR.

BY
ATTORNEY.

Feb. 2, 1960 P. L. SCHOONOVER 2,923,538
ROTARY KILN CONSTRUCTION
Filed Sept. 19, 1955 3 Sheets-Sheet 3

PAUL L. SCHOONOVER,
INVENTOR.

BY
Attorney.

United States Patent Office 2,923,538
Patented Feb. 2, 1960

2,923,538

ROTARY KILN CONSTRUCTION

Paul L. Schoonover, Sherman Oaks, Calif., assignor to Monolith Portland Cement Company, Los Angeles, Calif., a corporation of Nevada Application September 19, 1955, Serial No. 534,924

2 Claims. (Cl. 263—33)

The present invention relates to the construction of new and improved rotary kilns. More specifically, the invention relates to apparatus forming a part of a rotary kiln, which apparatus is used to introduce solid material into the kiln proper.

Rotary kilns as used in the cement and a large number of other industries consists of an elongated cylinder mounted at an angle to the horizontal in such a manner that it can be rotated. During rotation of a cylinder of this type solid material is introduced into the upper end of the cylinder and is conveyed as a result of the rotation to the lower end of the cylinder while being treated within the kiln. Normally such treatment includes contacting the solid material with hot gases which are passed through the kiln in the opposite direction to the direction of movement of the solid material.

In the construction and operation of rotary kilns of this category there are a number of problems. Certain of these problems involve introducing finely ground solid material into the kiln proper without causing a part of this material to be picked up by a hot gas stream. Normally these streams have a very high velocity. If any substantial amount of gas turbulence is present where the solid material is introduced into the kiln proper a material amount of the solid material may be lost as dust in the gas stream. On many occasions separate dust collectors have been employed to recover this lost material.

An objective of this invention is to provide constructions for introducing finely divided solid material into a rotary kiln which substantially do away with problems such as are briefly indicated in the preceding paragraph. A more specific object of the invention is to provide means for introducing solid material into a rotary kiln which serves to constrict the gas flow through the kiln adjacent to these means so as to create a quiescent gas zone next to these means in order that solid material can be introduced into this quiescent zone. Thus, by this expedient, loss of solid material into the gas stream is substantially eliminated.

Such loss of solid material is also reduced with the present invention by forming the means employed to introduce the solid material into a rotary kiln in such a manner that the material introduced into the kiln is deposited during rotation of the kiln upon and adjacent to material already present within the kiln. This feature of depositing material is considered to be quite important since with the prior known structures material is dumped or conveyed into the kiln proper in such a manner as to cause dust loss. This has the effect of resulting in some of this material being picked up by a gas stream and carried from the kiln as dust. An object of this invention is to provide means for introducing solid material into a kiln and for depositing such material already in the kiln so as to avoid undesired dust losses.

Other objects of this invention are to provide efficient, easily and comparatively cheaply manufactured structures for carrying out the aforegoing objectives, as well as to provide methods for introducing material into a rotary kiln as herein described. Still further objects of this invention, as well as many advantages of it, will be apparent from the remainder of this specification, including the appended claims and the accompanying drawings in which:

The actual inventive subject matter considered to be present in this specification is defined or summarized in detail by the appended claims. If desired, it may be indicated for purposes of explanation that this invention concerns rotary kilns incorporating a plurality of members for introducing material into these kilns, each of these members having an inlet located on the outside of a kiln, a passage leading from such an inlet into the interior of the kiln, and an outlet connected to such a passage, this outlet being located within the interior of the kiln. These members are preferably formed of steel or other equivalent material, and are located as hereinafter described.

Figure 1:
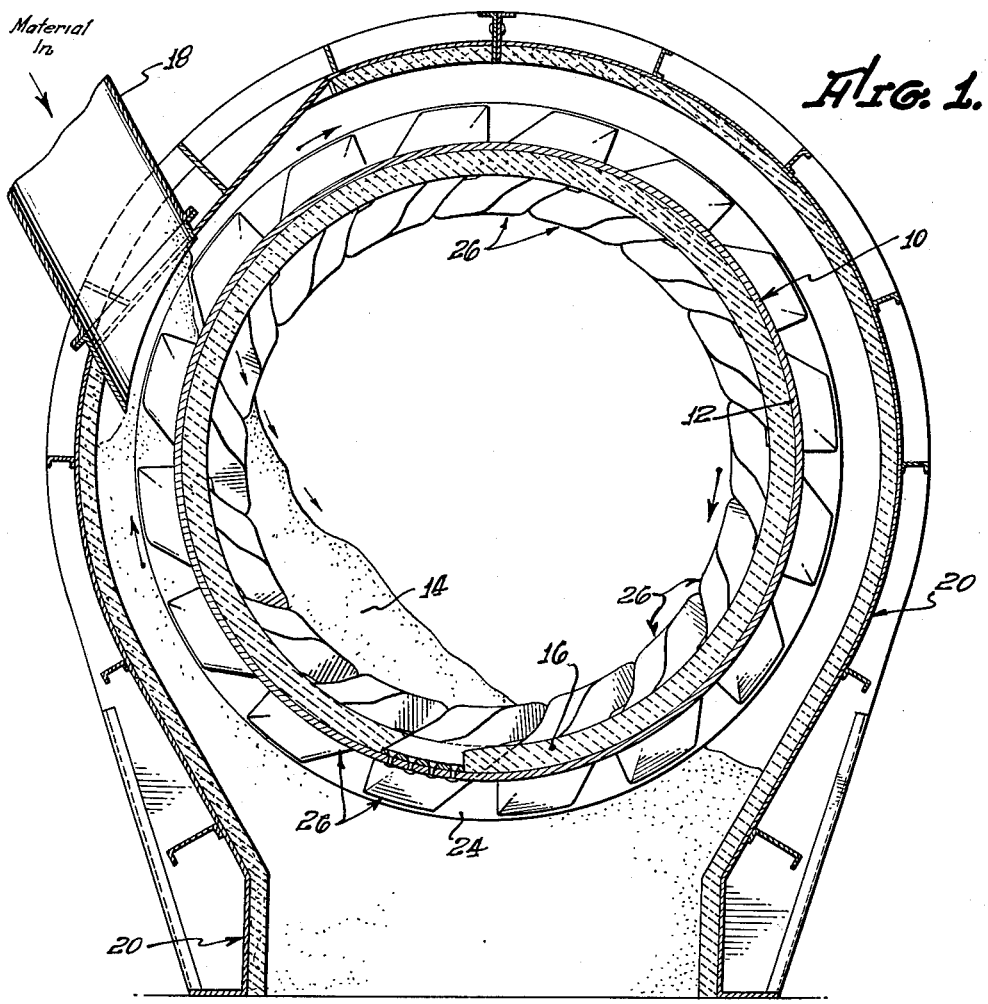
Fig. 1 is a cross sectional view taken generally along line 1—1 of Fig. 2, showing in cross section a rotary kiln of the present invention.
Figure 2:
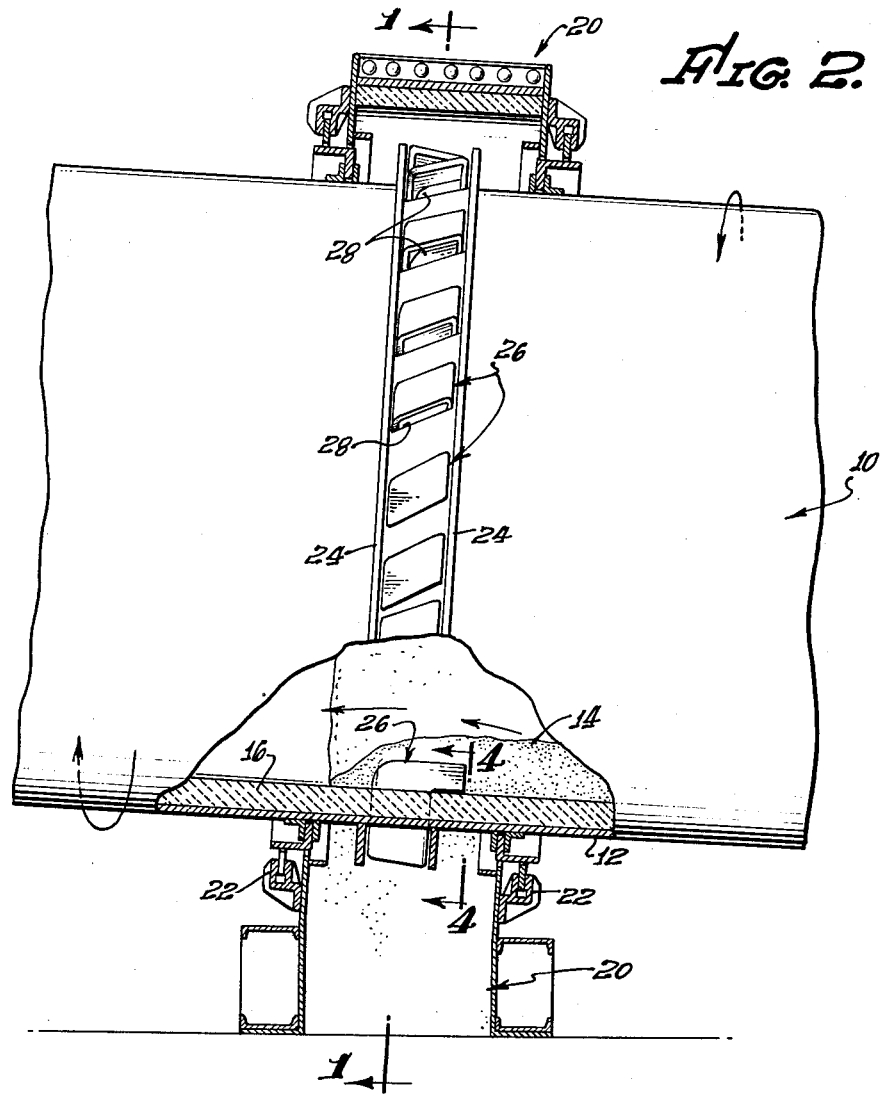
Fig. 2 is a side view of the structure shown in Fig. 1, this view being partially in cross section.
Figure 7:
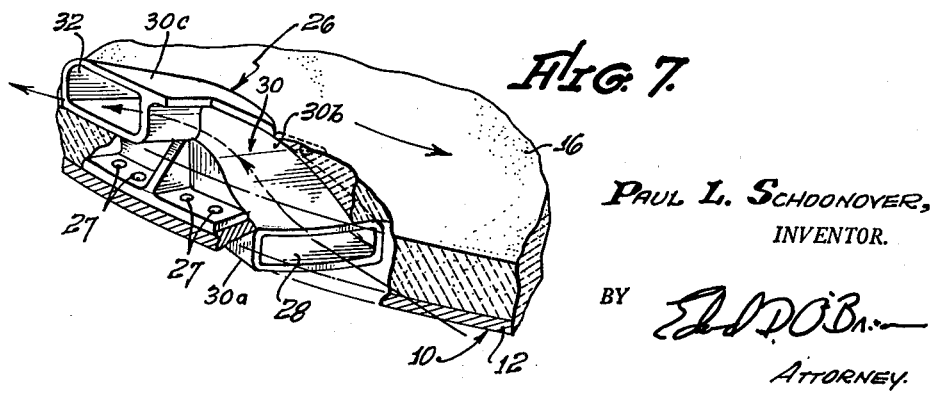
Fig. 7 is an isometric view illustrating in greater detail the construction of a member formed in accordance with this invention for introducing material into a rotary kiln.
Figure 4:
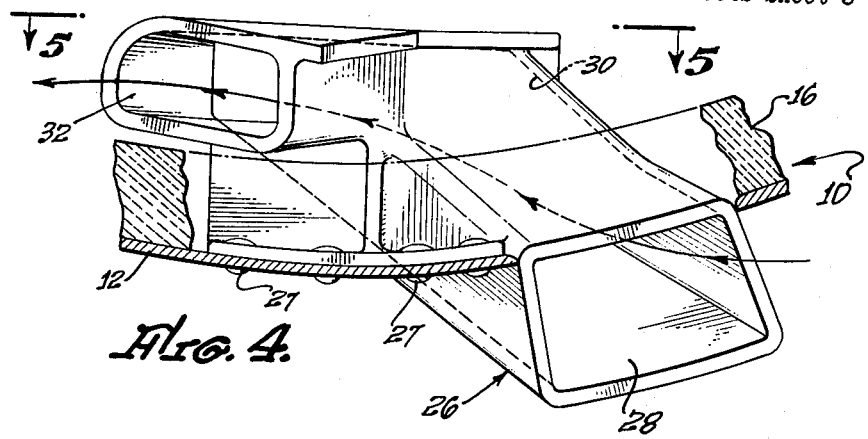
Fig. 4 is a cross sectional view taken on line 4—4 of Fig. 2.
Figure 5:
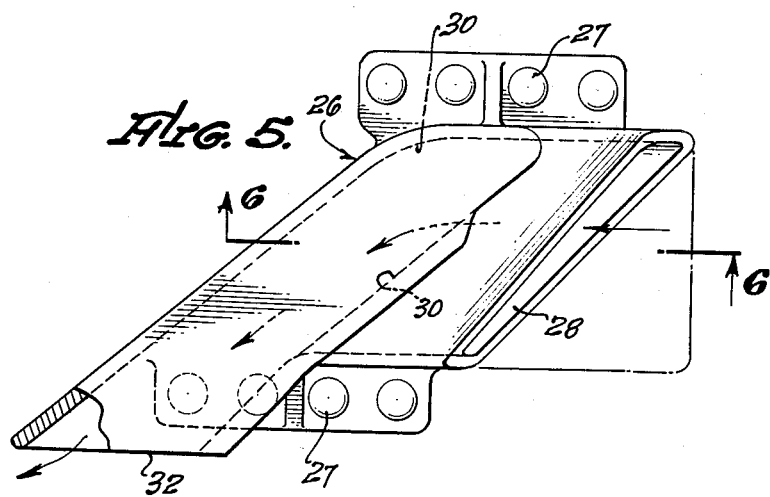
Fig. 5 is a view taken on line 5—5 of Fig. 4.
Figure 6:
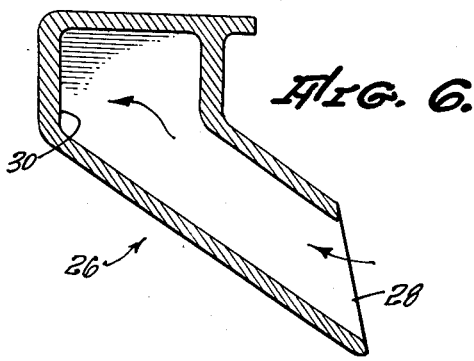
Fig. 6 is a cross sectional view taken on line 6—6 of Fig. 5.

In Figs. 1 and 2 of the drawings there is shown part of a conventional rotary kiln 10 employing this invention. This kiln 10 includes an elongated cylindrical metal shell 12 located upon conventional means (not shown) so that as the kiln 10 may be rotated in the direction indicated in order to move material 14 within the kiln in the direction shown. When the kiln 10 is employed in the cement or other similar industries a refractory brick lining 16 is normally located within the shell 12 so as to prevent damage from hot gases flowing within the kiln. Such gas flow is normally countercurrent to the movement of the material 14 as shown in the drawings; during the operation of the kiln 10 the material 14 normally is carried within the kiln 10 at the side of this kiln as shown at what is termed an angle of repose.

With the preferred embodiment of the invention finely ground solid material being fed into the kiln 10 is conveyed through a chute 18 into a housing 20 surrounding the kiln 10. The edges of the housing 20 adjacent to this kiln are sealed with respect to the kiln by conventional rotary seals 22 so as to prevent gas leakage. As is best seen in Fig. 1 of the drawings, the chute 18 is directed downwards at an angle so as to be pointed between two parallel projecting flanges 24 placed around the shell 12. Between these two flanges there is located what amounts to a ring of individual members 26 used to convey material from the chute 18 into the kiln 10. These members 26 are thus located in a plane at right angles to the axis of the kiln 10; they are attached to the shell 12 by rivets 27 or other equivalent means. The flanges 24 serve to aid in directing the material from the chute 18 into the members 26, and hence may be termed guide means. If desired, these flanges 24 can be formed as projections on the members 26.

These members 26 can be termed scoops since they are provided with inlets 28 located on the outside of the kiln between the flanges 24 substantially facing the direction of rotation of the kiln so as to pick up material from the chute 18 as the kiln 10 is rotated. The actual construction of the members 26 is best seen in Figs. 4, 5, 6 and 7 of the drawings. Here it is shown that the inlet 28 for any one of the members 26 is connected to a curved conduit, passage or conveyor section 30 leading to the interior of the kiln 10. The preferred shape of the section 30, as shown in the drawing, serves to prevent a back flow. Each of the curved conduits 30 includes one part 30a located on the exterior of the kiln shell 12, another part 30b extending in a radial manner through the kiln shell 12, and another part 30c curving away from the transverse plane of the members 26 within the interior of the kiln shell 12 so as to extend parallel to the axis of the kiln shell toward the lower end of the kiln. In the interior of the kiln each of the members 26 is provided with an outlet 32 from the part 30c of the conduit 30 substantially facing the lower end of the kiln in the direction of material movement through the kiln. Each outlet 32 is located between the kiln shell 12 and the portion of the wall of the conduit 30 extending closest to the axis of the kiln.

As is best seen in Fig. 1 of the drawings, all of the outlets 32 project into the interior of the kiln 10 past the brick lining 16 so as to define what amounts to a ring or restricted orifice for the passage of gas within the kiln. This ring or orifice is quite important to one aspect of the operation of the invention because, while of an essentially non-continuous segmental construction, it serves to cause the gas flow within the kiln 10 adjacent to the members 26 to constrict in diameter, resulting in a substantially quiescent gas zone surrounding the outlets 32. If desired, bricks or other material can be spaced within the kiln 10 between the members 26 so as to make this ring or orifice substantially continuous, but this is not considered necessary in order to obtain the advantages of this invention.

The members 26 are curved in such a manner that when the kiln 10 rotates material from the chute 18 goes into the inlets 28 and thence through the passages 30 and through the outlets 32. The inlets 28 are so formed as to generally face the direction of rotation of the kiln 10, while the outlets 32 are positioned at an angle to the inlets 28 so that material entering the kiln is conveyed towards the sides of the members 26 facing the direction of material travel within the kiln. Further, these outlets are so located that when material passes through them this material is deposited in the quiescent zone referred to above.

Figure 3A:
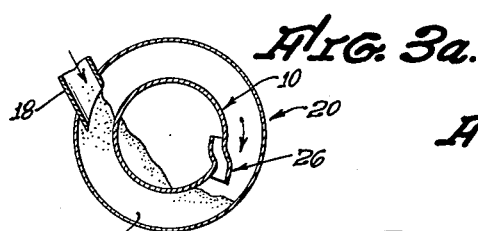
Figs. 3a, 3b and 3c are schematic views explaining the operation of the instant invention.
Figure 3B:
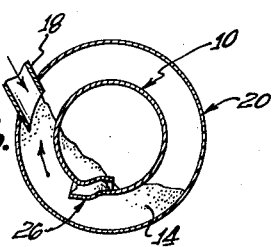
Figure 3C:
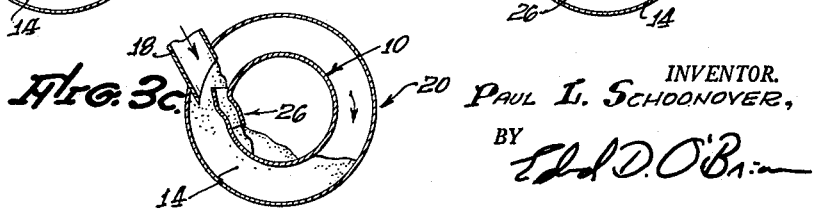

In Figs. 3a, 3b and 3c the manner in which the members 26 operate is diagrammatically illustrated. As the kiln 10 turns a member 26 first dips into any material which may be in the housing 20 so as to pick up part of this material, and then, if not full, receives further material from the chute 18. Because of the shape of the passage 30 such material is not conveyed directly into the kiln 10, but only moves into the kiln during rotation so that this material is deposited through the outlet 32 upon the material 14, as the member passes the material in the kiln and the angle of repose referred to earlier. In essence, a member 26 pulls away from the material passing through the outlet instead of cascading such material within the kiln. It is considered obvious that this does not involve any substantial amount of turbulence, and hence substantially no material is picked up by the gas flowing through the kiln. It is important to have a sufficient number of these members 26 so that the flow of material into the kiln is substantially continuous.

Those skilled in the art to which this invention pertains will realize that a number of modifications may be made without departing from the essential features of the invention. As an example of such modification, the inlets 28 may extend as indicated by the dotted lines in Fig. 5, or the shape of the passages 30 may be altered. Thus, it is also possible to form the passages 30 so that they are substantially straight and still retain some of the advantages of the invention, although this is not preferred because kilns having such passages will not operate as well as kilns in which the members 26 are of the configuration indicated in the drawings. All such modifications are to be considered as part of the present invention insofar as they are defined by the appended claims. Although extensive reference has been made in this specification to the use of this invention in the cement industry, it is considered obvious that it can be employed with rotary kilns used for any purpose.

I claim:
1. In a rotary kiln having an elongated, cylindrical kiln shell rotatably mounted at an angle to the horizontal so as to have an upper end and a lower end, said kiln shell being mounted so as to be capable of being rotated in a given direction about its axis so as to cause material within said kiln shell to move toward the lower end of said kiln shell while gas flows from one end of said kiln shell to the other end of said kiln shell, the improvement which comprises: a plurality of members for introducing material into the interior of said kiln shell from the exterior thereof, said members being located in a plane at a right angle to the axis of said kiln shell, each of said members including a curved conduit, one part of which is located on the exterior of said kiln shell in said plane, another part of which extends in a radial manner through said kiln shell into the interior thereof, and another part of which curves away from said plane within the interior of said kiln shell so as to extend parallel to the axis of said kiln shell toward said lower end of said kiln shell, said members each including an inlet to the conduit on such member, said inlets facing in said direction of rotation and being located on the exterior of said kiln shell within said plane, and each of said members including an outlet from the third-mentioned part of said conduit, said outlets facing said lower end of said kiln shell, said outlets being located between said kiln shell and the portions of said conduits extending closest to the axis of said kiln shell, said members being secured to said kiln shell with respect to one another so that the parts thereof located within said kiln shell form a non-continuous, restricted orifice located toward the upper end of said kiln shell from said outlets, said orifice extending substantially around the interior of said kiln shell and serving to constrict the flow of gas moving through said kiln so as to cause the formation of a quiescent gas zone adjacent to said outlets, whereby as said kiln is rotated in said given direction, material is moved from said inlets through said conduit parts and out through said outlets and is deposited in a quiescent gas zone created by said orifice restricting the flow of gas through said kiln shell.

2. In a rotary kiln as defined in claim 1 a pair of parallel flanges located in planes at right angles to the axis of said kiln, said flanges being secured to said kiln shell on the exterior thereof at the sides of the parts of said members located on the exterior of said kiln shell.

References Cited in the file of this patent
UNITED STATES PATENTS

| | | |
|---|---|---|
| 1,210,510 | Mason | Jan. 2, 1917 |
| 1,834,963 | Newhouse | Dec. 8, 1931 |
| 2,218,476 | Newhouse | Oct. 15, 1940 |
| 2,315,022 | Smith | Mar. 30, 1943 |
| 2,687,290 | Garoutte et al. | Aug. 24, 1954 |

FOREIGN PATENTS

| | | |
|---|---|---|
| 5,765 | Great Britain | 1905 |
| 644,247 | Great Britain | Oct. 4, 1950 |